Figure 1:
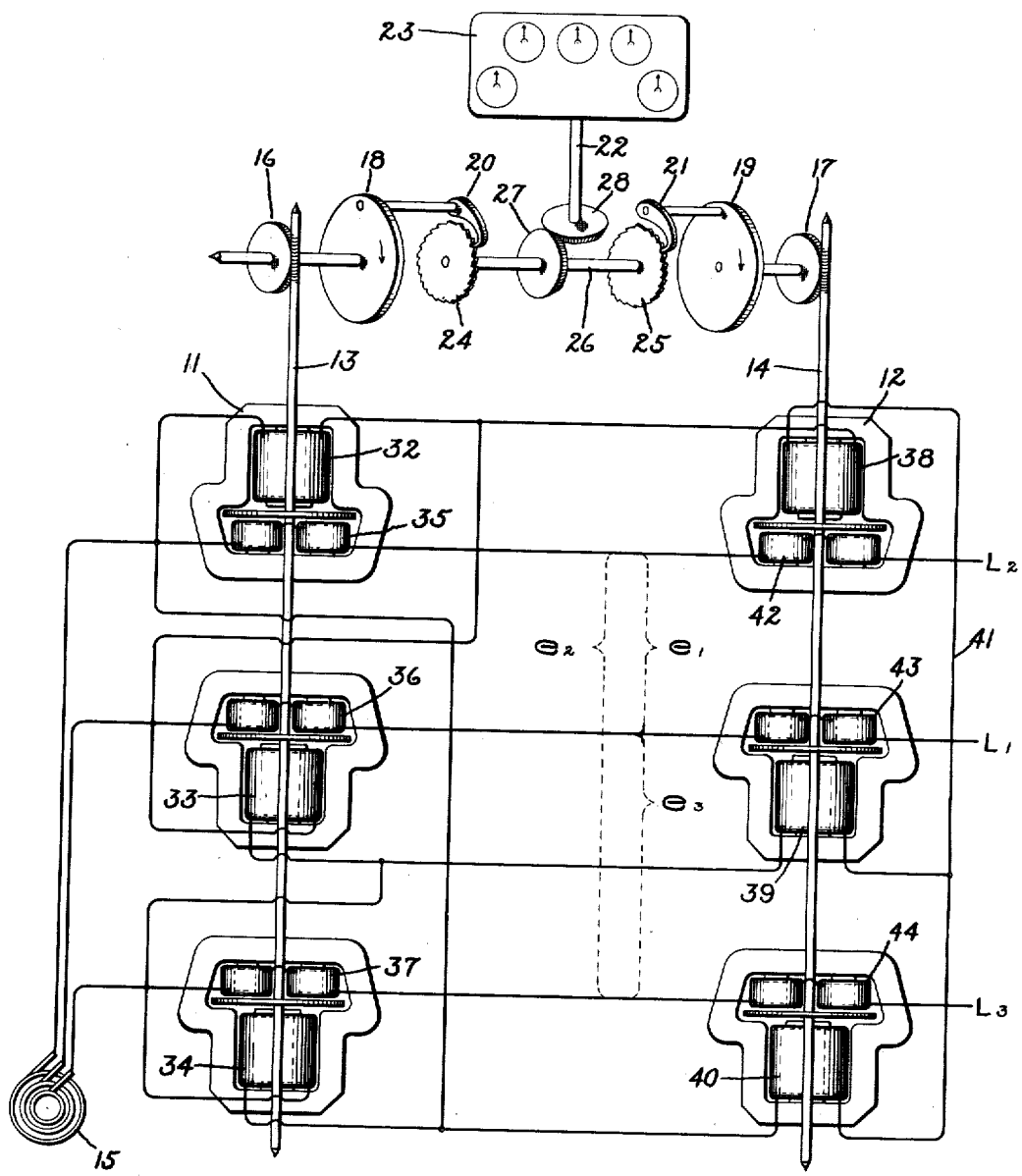

March 17, 1925.

W. H. PRATT

ELECTRICAL MEASURING INSTRUMENT

Filed Jan. 17, 1921  3 Sheets-Sheet 1

Inventor:
William H. Pratt,
by Albert G. Davis
His Attorney.

March 17, 1925.
W. H. PRATT
ELECTRICAL MEASURING INSTRUMENT
Filed Jan. 17, 1921     3 Sheets-Sheet 2
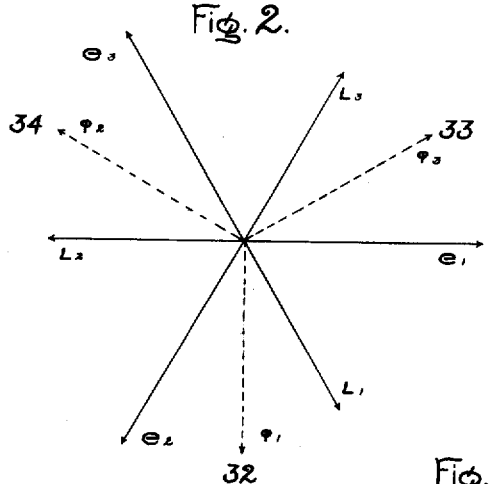
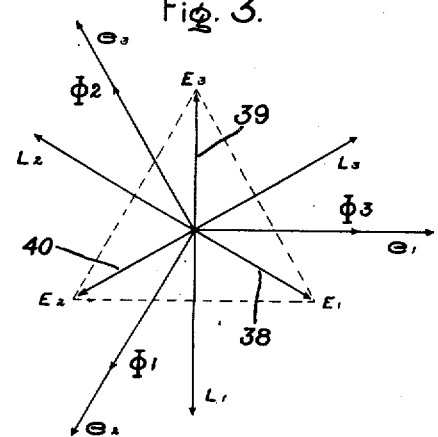
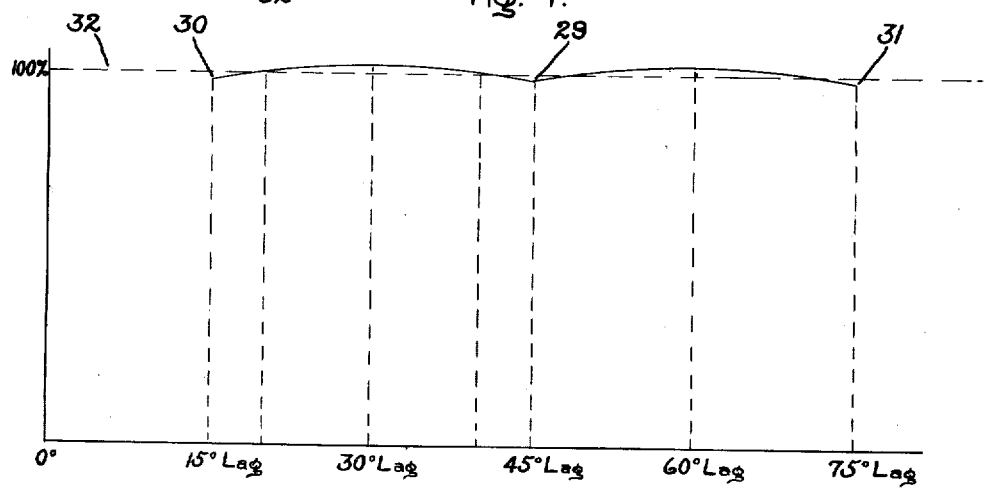
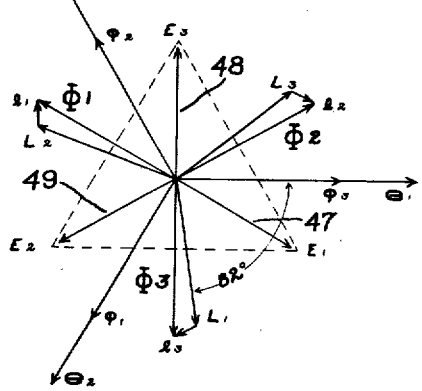
Inventor:
William H. Pratt,
by Albert G. Davis
His Attorney.

March 17, 1925.
W. H. PRATT
1,530,322
ELECTRICAL MEASURING INSTRUMENT
Filed Jan. 17, 1921  3 Sheets-Sheet 3
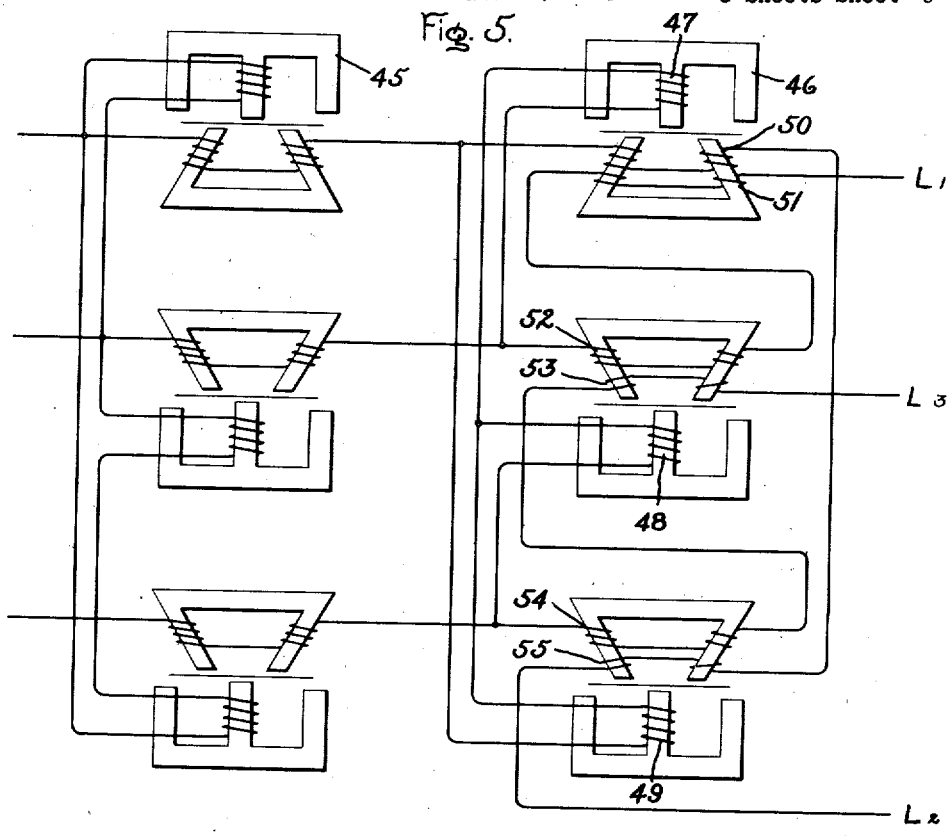
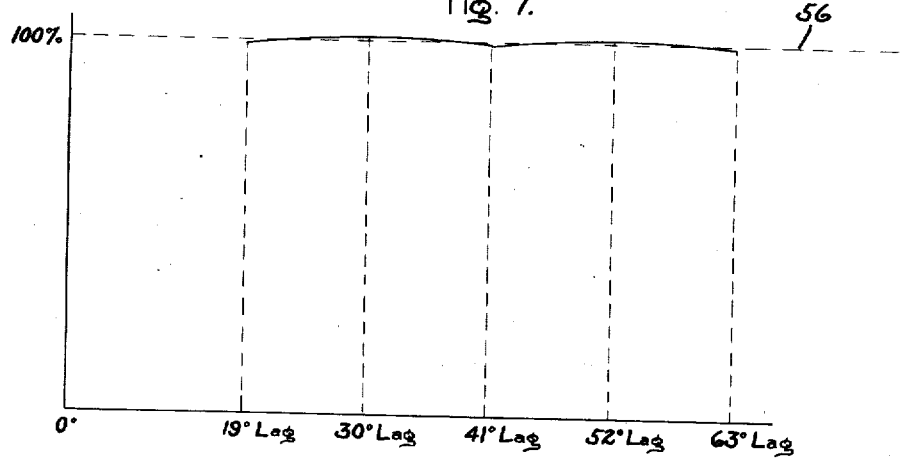
Inventor:
William H. Pratt,
by Albert G. Davis
His Attorney.

Patented Mar. 17, 1925.

1,530,322

UNITED STATES PATENT OFFICE.

WILLIAM H. PRATT, OF LYNN, MASSACHUSETTS, ASSIGNOR TO GENERAL ELECTRIC COMPANY, A CORPORATION OF NEW YORK.

ELECTRICAL MEASURING INSTRUMENT.

Application filed January 17, 1921. Serial No. 437,687.

*To all whom it may concern:*

Be it known that I, WILLIAM H. PRATT, a citizen of the United States, residing at Lynn, county of Essex, State of Massachusetts, have invented certain new and useful Improvements in Electrical Measuring Instruments, of which the following is a specification.

This invention relates to electrical measuring instruments, and more particularly to instruments adapted to measure the kilovolt ampere hours expended in any circuit.

In some instances it is necessary to obtain the product of the volts and amperes expended at the load or supplied by a generator, which value is, of course, independent of the power factor. Furthermore, the integration of this product over an extended period is desired. Heretofore special apparatus had to be installed to obtain this value. The main object of my invention is to provide such an instrument incorporating features of construction already well understood. Other objects and advantages of my invention will become apparent as the description proceeds.

The principal feature of my invention consists in adjusting a plurality of measuring elements in such a way that each will rotate at its maximum possible speed for a certain definite value of the power factor of the circuit measured, and arranging these instruments so that a properly constructed indicator is moved in accordance with the fastest moving element. By constructing and adjusting these elements so that the power factors at which they rotate at their maximum speed vary from element to element by small increments, and so that the maximum speed is the same for each instrument for the same value of kilovolt amperes, it is possible to obtain a registration practically equivalent to the kilovolt ampere hours consumed. For example, in the embodiments illustrated in this application I employ two polyphase integrating meter elements of the induction type, both of standard construction, one so arranged that when the power factor of the load is at a certain value the flux due to the potential coils will be exactly 90° displaced from the flux due to the current coils and the spindle on the element will rotate at its maximum speed for this power factor; and the other element is similarly adjusted for a slightly different power factor and the spindles of both elements are connected by means of a pawl and ratchet arrangement to a common shaft so that this common shaft will be rotated in accordance with the fastest moving spindle. This latter shaft actuates an indicating means similar to the ordinary indicator or register of an indicating power meter.

Of course more than two measuring elements may be used if the variations in power factor of the system measured require it. However, even with two such instruments it is entirely possible to get a fairly accurate range between, say, power factors corresponding to 19° lag and 63° lag. In the instrument which I describe in which these limits are used the maximum error is less than 1% with the likelihood that the average error would be considerably less. This degree of accuracy is quite acceptable for a commercial installation.

For a better understanding of my invention attention is called to the following description taken in connection with the accompanying drawings in which Fig. 1 shows a diagrammatic representation of an electrical instrument and its connections adapted to measure the kilovolt ampere hours between a range of unity power factor and a power factor corresponding to 75° lag; Fig. 2 is a diagram showing the vector relations of the E. M. F.'s and fluxes of one of the two measuring elements; Fig. 3 is a similar diagram showing vector relations of the other measuring element; Fig. 4 is a calibration curve showing how the registration deviates from accuracy as the power factor varies; Fig. 5 shows diagrammatically a possible modification of the instrument which is adapted to measure the kilovolt ampere hours for power factors ranging from 19° lag to 63° lag; Fig. 6 is a diagram showing the vector relations of the currents, E. M. F.'s and fluxes of one of the measuring elements of Fig. 5; and Fig. 7 is a calibration curve for the instrument illustrated in Fig. 5.

Referring now more in detail to the drawings in which like reference characters refer to like parts throughout, I have shown in Fig. 1 a plurality of meter elements 11 and 12, having rotatable spindles 13 and 14. In this embodiment I have shown induction type watt-hour meter elements, but it is to be understood that other forms of meter elements may be used if desired. The instrument I have shown is connected to a three-phase circuit and is arranged to measure the kilovolt ampere hours of the circuit supplied by an alternator 15. Each measuring element comprises three single phase induction watt hour meters. The measuring element 11 is so connected in the present instance that the spindle 13 rotates at its fastest rate when the load is lagging and the power factor of the system is equal to the cosine of 30°, or .866. The element 12 is so connected that the spindle 14 is rotated at its fastest rate when the power factor is equal to the cosine of 60°, or .500, and is lagging.

Both the spindles 13 and 14 are mechanically connected such as by worm gearing 16 and 17 and discs 18 and 19 to pawls 20 and 21. The pawls 20 and 21 cooperate with the ratchet wheels 24 and 25 carried by a shaft 26 to which is rigidly fastened a gear 27 meshing with the gear 28 fastened to the measuring shaft 22 of the register 23. The measuring elements 11 and 12 are so connected that they tend to rotate the discs 18 and 19 in the direction shown by the arrows thereon. It is evident from this mechanical construction that the register shaft 22 rotates in accordance with the maximum measuring effect of the two spindles 13 and 14.

It is evident that the register 23 will be actuated fastest when the load is lagging by exactly 30° or by exactly 60°, for the same value of K. V. A. For other power factors one or the other of the two measuring elements will rotate at a faster speed and it is in accordance with this movement that the register 23 is actuated. Attention is called to Fig. 4, which shows the calibration curve of the instrument upon a variation in power factor. At 15° lag the element 11 will rotate faster than element 12 since 15° is nearer to 30° than it is to 60°, and the ratio of its speed at 15° to its speed at 30° is .9659 or the cosine of (30—15°). The instrument may be so adjusted as to give correct registration when the spindle 13 rotates .9829 times as fast as the maximum speed, which value is the average between the speeds at 15° lag and at 30° lag. This value corresponds to a power factor equal to the cosine of (30°±10° 36′). These values are obtained by noting that an angle of 10° 36′ has a cosine equal to .9829, and that there must therefore be this deviation from a 30° lag (corresponding to maximum speed) to make the speed of the spindle 13 equal to .9829 of the maximum. Thus for power factors corresponding to 19° 24′ lag or 40° 36′ lag, the instrument registers accurately. It also registers accurately at two other points as shown on the curve in Fig. 4. These latter points may be obtained from the sine curve which has its maximum value at 60° lag as indicated, and intersecting the first sine curve at the point 29, said latter curve corresponding to element 12. These sine curves represent the calibration curve of the combined instrument, since upon a variation in power factor between cosine 15° and cosine 45°, but when the kilovolt amperes remain the same, the speed of element 11 will be represented by the curve between the points 30 and 29, while the speed of element 12 for variation in power factor of cosine 45° and cosine 75° is represented by the curve between points 29 and 31. This is based on the assumption that the torque exerted by a meter of the induction type is proportional to the sine of the phase angle beween the fluxes produced by the current and potential coils. The horizontal dotted line 32 represents the calibration curve if the instrument were absolutely accurate. It is seen that the maximum variation from accuracy occurs at power factors corresponding to cosine 15°, cosine 30°, cosine 45°, cosine 60° and cosine 75°. This variation is equivalent to one-half of the difference between cosine 30° and cosine 15°, or something like 1½%.

As stated heretofore, element 11 is so adjusted that its spindle 13 is rotated at its maximum speed when the load lags by an angle of 30°. To understand how this may be accomplished, attention is called to Fig. 2 which shows the vector relations of the currents flowing in the various lines, the E. M. F.'s impressed on the coils and the fluxes obtained therein. The vectors $e_1$, $e_2$ and $e_3$ are the E. M. F.'s obtained respectively between lines $L_1$ and $L_2$; lines $L_2$ and $L_3$; and lines $L_3$ and $L_1$. It may be readily ascertained that when the load has a power factor of cosine 30° and is lagging, then the current in line $L_1$ is lagging by 60° behind the E. M. F. $e_1$. This is shown in Fig. 2. The corresponding currents in the other two lines $L_2$ and $L_3$ are shown by the vectors appropriately labeled in this figure. The potential coil 32 is as is evident from Fig. 1 connected between lines $L_2$ and $L_1$ and has impressed on it an E. M. F. equal to $e^1$. Since the circuit of this coil is highly inductive, the flux lags by 90° behind $e_1$ as is shown by the dotted arrow labeled $\varphi_1$. In the same way the potential coil 33 is connected between lines $L_1$ and $L_3$ and has nected between lines $L_1$ and $L_3$ and has therefore an E. M. F. impressed upon it represented by the vector $e_3$, and produces a flux $\varphi_3$. The potential coil 34 similarly has an E. M. F. of $e_2$ impressed upon it and produces a flux $\varphi_2$. The current coil 35 produces a flux in phase with the current flowing through it of $L_2$. The flux produced by this coil coacts with the flux $\varphi_1$ of the potential coil 32. It is seen that the angle between vector $\varphi_1$ and $L_2$ is 90°, and therefore a maximum torque is produced. In the same way the current represented by vector $L_1$ coacts with flux $\varphi_3$, while the flux produced by the current coil 37 represented by the vector $L_3$ coacts with the flux $\varphi_2$. In all three cases the current and the coacting potential fluxes are displaced by 90°. It is evident therefore that at 30° lag the element 11 will rotate at its maximum speed.

The element 12 as stated heretofore is so arranged that spindle 14 is rotated at its maximum speed when the power factor of the circuit is equal to the cosine of 60°. This result is obtained by connecting the potential coils 38, 39 and 40 in $\gamma$ instead of in delta as the potential coils in the element 11. The common wire connection is represented by the wire 41. The vector relations may best be understood by reference to Fig. 3. In this figure the vectors $e_1$, $e_2$ and $e_3$ still represent the E. M. F.'s between the lines as in the previous case. However, since now we are assuming that the current is lagging by 60° in the load in a three phase system, it may readily be ascertained that the current vectors will be displaced as shown, that is, the current in line $L_1$ will be 90° displaced from the E. M. F. vector $e_1$, while the other vectors $L_2$ and $L_3$ take corresponding positions with respect to the other electromotive force vectors.

Since the coils 38, 39 and 40 are connected in $\gamma$, the E. M. F. impressed upon coil 38 may be represented by the vector $E_1$, that impressed upon coil 39 by vector $E_3$ and that impressed upon coil 40 by the vector $E_2$. Thus the vector difference of $E_2$ and $E_1$ give a vector equal to vector $e_1$ and similarly for the other E. M. F. vectors $e_2$ and $e_3$. The flux produced by the potential coil 38 is represented by $\varphi_1$, the flux produced by the potential coil 39 is represented by the vector $\varphi_3$ and the flux produced by the coil 40 is represented by the vector $\varphi_2$. The fluxes produced by the current coils 42, 43 and 44 are in phase with the current vectors $L_1$, $L_2$ and $L_3$. The flux produced by current $L_1$ coacts with the flux $\varphi_3$, the flux produced by current $L_2$ coacts with flux $\varphi_1$, while the flux produced by current $L_3$ coacts with flux $\varphi_2$. In this case also it is seen that the angles between these coacting vectors are exactly 90° and therefore the element 12 rotates at its maximum speed when the load is lagging by 60°.

Returning now to Fig. 4, it is evident that by this means a fairly accurate measurement of the kilovolt ampere hours may be obtained. By drawing line 32 so as to obtain equal over or under registration for power factors corresponding to 15°, 30°, 45°, 60° and 75°, the variation from accuracy at the fastest moving point and the slowest moving point is reduced to a relatively small amount. Furthermore, the actual error would be much less than this and probably no more than one-half this maximum error, or lower than 1%.

With the modification just described it is assumed that the power factor of the load may be anywheres between the cosine of 15° and the cosine of 75°. Ordinarily, however, such greatly lagging loads are seldom encountered. It seems desirable, then, to construct two elements so that one rotates its spindle at its maximum speed at a power factor in the neighborhood of .866 and the other in the neighborhood of .600. The embodiment of my invention shown in Fig. 5 accomplishes this result, and is adapted to give much more accurate results for a range in power factor of, say, between .95 and .454. These values represent respectively the cosines of the angles 19° and 63°, and it is comparatively seldom that the load falls without these two limits.

In this case, as in the preceding one, I show two measuring elements 45 and 46, the magnetic circuits of the induction meter parts being indicated still more diagrammatically. The element 45 is so arranged that it rotates at its maximum speed when the load has a power factor corresponding to the cosine of 30°, while the element 46 is so arranged that it rotates its spindle at a maximum speed when the load has a power factor corresponding to the cosine of 52°. Thus element 45 has its potential coils connected in delta in the same way as element 11, in the first embodiment described. The vector relations at 30° lag therefore are accurately represented in Fig. 2.

In order to understand, however, how I may obtain a maximum registration for element 46 when there is a 52° lag, attention is called to Fig. 6 which is a vector diagram of the currents, E. M. F.'s and fluxes of this element. As before, vectors $e_1$, $e_2$ and $e_3$ represent the E. M. F.'s between the lines $L_1$, $L_2$ and $L_3$. The potential coils 47, 48 and 49 are connected in $\gamma$ as in element 12. However, each of the induction meter parts has two current coils, instead of a single one. Thus the current coils 50 and 51 which are so arranged as to coact with the potential coil 47 carry respectively currents in lines $L_2$ and $L_1$. In the same way the current coils 52 and 53 coacting with the potential coil 48 carry currents from lines $L_1$ and $L_3$, while current coils 54 and 55 coacting with potential coil 49 carry currents from lines $L_3$ and $L_2$.

Attention is now directed to the uppermost induction meter of the element 46. When the power factor of the circuit is 52°, then the E. M. F. impressed upon coil 47 may be represented by $E_1$. The flux produced by this coil is represented by $\varphi_1$. The flux produced by the current coil 50 is represented by vector $L_2$. This vector $L_2$ is one of the three vectors which is in the same direction as the currents in the lines $L_1$, $L_2$ and $L_3$. The vector $L_1$ in this instance is shown as being displaced by 82° from the E. M. F. vector $e_1$ since this is the vector relation when the load lags by 52°. The flux $\varphi_1$ in order that the torque be a maximum at this power factor must coact with a flux displaced 90° from it. This flux is represented by the vector $\Phi_1$. In order to obtain this flux in this relation it is necessary to add to the flux $L_2$ a small flux $1_1$ which is in a direction parallel with the current vector $L_1$. This small vector $1_1$ represents the contribution of coil 51 to the total flux. The relative number of turns in the coils 51 and 52 are so chosen that the proper dephasing between the vector $\Phi_1$ and vector $\varphi_1$ is obtained. It is evident in the present instance that the dephasing amounts to 8°, since as may be easily ascertained the angle between $\varphi_1$ and $L_2$ is 82°.

In a similar manner the potential impressed upon coil 48 is represented by the vector $E_3$ and the flux produced thereby is represented by the vector $\varphi_3$. This vector coacts with a flux $\Phi_3$ displaced 90° from it and which is the sum of the two vectors $L_1$ and $1_3$. The vector $L_1$ represents the flux produced by the coil 52, while the vector $1_3$ represents the flux produced by the coil 53.

The potential impressed upon the coil 49 is represented by the vector $E_2$. It produces a flux $\varphi_2$ displaced 90° from it which flux coacts with the $\Phi_2$, the sum of the two vectors $L_3$ and $1_2$. The vector $L_3$ represents the flux contributed by the current coil 54, while small vector $1_2$ represents the flux contributed by the current coil 55. In each case it is seen that the coacting fluxes are in proper phase relations to produce maximum speed of the spindle of element 46 when the power factor of the load is equal to the cosine of 52°.

The calibration curve for the modification of my instrument illustrated in Fig. 5 is shown in Fig. 7. In this case a line 56 representing true kilovolt ampere hours intersects the two sine curves representing the speed of the elements 45 and 46 between power factors corresponding to the cosine of 19° and cosine 63°. In this case the true kilovolt ampere hour line 56 is drawn so as to give the same amount of under-registration or over-registration at speeds corresponding to 19°, 30°, 41°, 52° and 63°. Since the cosine of 19° is equal to .9816 the maximum error is equal to one-half of the difference between 1 and .9816 or .0092. However, this maximum error can occur only at five values of the power factor, and it is quite likely that the error over a fairly long period of time would be somewhere in the neighborhood of one-half of one per cent. This error is quite inappreciable in commercial instruments and it is therefore seen that my instrument is well adapted to give accurate results.

I have shown in the foregoing figures merely two modifications of my invention. It is to be understood, however, that other means may be utilized for producing substantially the same result so long as there are a plurality of elements, each adapted to rotate at its fastest speed for a certain predetermined power factor; or in case merely an instantaneous indication is required, they may be adjusted to produce a maximum measuring effect at definite power factors. I do not wish, therefore, to be limited to the modifications I have illustrated but aim to embrace in the appended claims all modifications falling fairly within the scope of my invention.

What I claim as new and desire to secure by Letters Patent of the United States, is,—

1. In an electrical measuring instrument for alternating current circuits, a plurality of measuring elements, each adjusted to produce a maximum measuring effect at a definite power factor, and indicating means connected to said elements and arranged to be actuated in accordance with the maximum actuation of the elements.

2. In an electrical measuring instrument for alternating current circuits, means for measuring a quantity proportional to the volt amperes expended in any circuit comprising a plurality of measuring elements, each adapted to be connected to the circuit, each adjusted to produce a maximum measuring effect at a definite power factor, and indicating means connected to said elements and arranged to be moved in accordance with the maximum of the measuring element movements.

3. In an instrument for measuring the kilovolt-ampere hours expended in an alternating current circuit, a plurality of integrating meter elements adapted to be connected into a circuit, each of said elements being adjusted so as to rotate at its fastest rate at a predetermined power factor of the circuit measured, and a register connected to said elements in such a way that it may be moved in accordance with the fastest moving element.

4. In an electrical instrument, a plurality of meter elements respectively adjusted for accuracy at different values of an electric variable, a register, and means whereby the fastest moving element may actuate said register.

5. In an instrument for measuring the kilovolt ampere hours expended in an electrical circuit, a plurality of meter elements, each adjusted to rotate at a maximum speed for a predetermined power factor, a register, and means whereby the fastest moving element may actuate said register.

6. In an electrical instrument, a plurality of meter elements connected in the same circuit and respectively arranged to measure a quantity thereof at different power factors, a register, and pawl and ratchet connections between said elements and the register.

7. In an instrument for measuring the kilovolt ampere hours expended in an electrical circuit, a plurality of meter elements, each adjusted to rotate at a maximum speed for a predetermined power factor, a register, and pawl and ratchet connections between said elements and the register.

8. In an electrical measuring instrument, a plurality of induction meter elements, each having a spindle and cooperating current and potential coils, said coils being so adjusted that they cause the spindle to rotate at a maximum speed at a predetermined power factor, a register, and means whereby the register is actuated in accordance with the fastest moving element.

9. In an electrical system, means for measuring the kilovolt ampere hours used in the system comprising a plurality of induction meter elements, each having a spindle and cooperating current and potential coils, said coils being so connected to the system that they cause the spindle to rotate at a maximum speed at a predetermined power factor of the system, a register, and means whereby the register is actuated in accordance with the fastest moving element.

10. In a polyphase electrical system, means for measuring the kilovolt hours used in the system, comprising a plurality of induction meter elements having current and potential elements, a spindle operatively associated with said elements, the coils of said elements being so connected into the system that the spindle is rotated at a maximum rate when the power factor of the system being metered reaches a predetermined value, a second set of induction meter elements, a spindle cooperating therewith, the second set having its coils so connected that its spindle is rotated at a maximum rate for a different value of the power factor, a register, and means whereby the faster moving spindle may actuate the register.

11. In a polyphase system, means for measuring the kilovolt ampere hours expended therein, comprising a plurality of induction meter elements having current and potential coils, one of said elements having its potential coils connected in delta, and the series coils connected in series relation with the line, while the other element has coils so connected that the vector relations for a certain power factor for the fluxes produced by cooperating current and potential coils differ from those in the first element, and a register arranged to be moved in accordance with the fastest moving element.

12. In a polyphase system, means for measuring the kilovolt ampere hours expended therein, comprising a plurality of meter elements, each having a rotatable spindle and connected so as to rotate their spindles at a maximum speed for definite power factors, a register, a plurality of ratchet wheels mechanically connected to said register, and pawls cooperating with said ratchet wheels and mechanically rotated by the spindles for moving the ratchet wheels.

13. The method of measuring volt amperes of an alternating current circuit which consists in actuating a common indicator in accordance with the maximum actuation of a plurality of meter elements respectively arranged to measure the volt amperes of said circuit at different power factors.

14. The method of integrating volt amperes of an alternating current circuit which consists in actuating a common register in accordance with the maximum rotation of a plurality of integrating type meter elements respectively arranged to measure the volt amperes of said circuit at different power factors.

In witness whereof, I have hereunto set my hand this 14th day of January, 1921.

WILLIAM H. PRATT.

6. In an electrical instrument, a plurality of meter elements connected in the same circuit and respectively arranged to measure a quantity thereof at different power factors, a register, and pawl and ratchet connections between said elements and the register.

7. In an instrument for measuring the kilovolt ampere hours expended in an electrical circuit, a plurality of meter elements, each adjusted to rotate at a maximum speed for a predetermined power factor, a register, and pawl and ratchet connections between said elements and the register.

8. In an electrical measuring instrument, a plurality of induction meter elements, each having a spindle and cooperating current and potential coils, said coils being so adjusted that they cause the spindle to rotate at a maximum speed at a predetermined power factor, a register, and means whereby the register is actuated in accordance with the fastest moving element.

9. In an electrical system, means for measuring the kilovolt ampere hours used in the system comprising a plurality of induction meter elements, each having a spindle and cooperating current and potential coils, said coils being so connected to the system that they cause the spindle to rotate at a maximum speed at a predetermined power factor of the system, a register, and means whereby the register is actuated in accordance with the fastest moving element.

10. In a polyphase electrical system, means for measuring the kilovolt hours used in the system, comprising a plurality of induction meter elements having current and potential elements, a spindle operatively associated with said elements, the coils of said elements being so connected into the system that the spindle is rotated at a maximum rate when the power factor of the system being metered reaches a predetermined value, a second set of induction meter elements, a spindle cooperating therewith, the second set having its coils so connected that its spindle is rotated at a maximum rate for a different value of the power factor, a register, and means whereby the faster moving spindle may actuate the register.

11. In a polyphase system, means for measuring the kilovolt ampere hours expended therein, comprising a plurality of induction meter elements having current and potential coils, one of said elements having its potential coils connected in delta, and the series coils connected in series relation with the line, while the other element has coils so connected that the vector relations for a certain power factor for the fluxes produced by cooperating current and potential coils differ from those in the first element, and a register arranged to be moved in accordance with the fastest moving element.

12. In a polyphase system, means for measuring the kilovolt ampere hours expended therein, comprising a plurality of meter elements, each having a rotatable spindle and connected so as to rotate their spindles at a maximum speed for definite power factors, a register, a plurality of ratchet wheels mechanically connected to said register, and pawls cooperating with said ratchet wheels and mechanically rotated by the spindles for moving the ratchet wheels.

13. The method of measuring volt amperes of an alternating current circuit which consists in actuating a common indicator in accordance with the maximum actuation of a plurality of meter elements respectively arranged to measure the volt amperes of said circuit at different power factors.

14. The method of integrating volt amperes of an alternating current circuit which consists in actuating a common register in accordance with the maximum rotation of a plurality of integrating type meter elements respectively arranged to measure the volt amperes of said circuit at different power factors.

In witness whereof, I have hereunto set my hand this 14th day of January, 1921.

WILLIAM H. PRATT.

Certificate of Correction.

It is hereby certified that in Letters Patent No. 1,530,322, granted March 17, 1925, upon the application of William H. Pratt, of Lynn, Massachusetts, for an improvement in "Electrical Measuring Instruments," an error appears in the printed specification requiring correction as follows: Page 5, line 35, after the word "kilovolt" insert the word *ampere;* and that the said Letters Patent should be read with this correction therein that the same may conform to the record of the case in the Patent Office.

Signed and sealed this 21st day of April, A. D. 1925.

[SEAL.]

KARL FENNING,
*Acting Commissioner of Patents.*

Certificate of Correction.

It is hereby certified that in Letters Patent No. 1,530,322, granted March 17, 1925, upon the application of William H. Pratt, of Lynn, Massachusetts, for an improvement in "Electrical Measuring Instruments," an error appears in the printed specification requiring correction as follows: Page 5, line 35, after the word "kilovolt" insert the word *ampere;* and that the said Letters Patent should be read with this correction therein that the same may conform to the record of the case in the Patent Office.

Signed and sealed this 21st day of April, A. D. 1925.

[SEAL.]

KARL FENNING,
*Acting Commissioner of Patents.*